United States Patent [19]
Ploeger

[11] 4,058,185
[45] Nov. 15, 1977

[54] AUTOMATIC WHEEL BEARING LUBRICATOR

[76] Inventor: Kenneth C. Ploeger, 5th & Dryden, Odessa, Mo. 64076

[21] Appl. No.: 712,930

[22] Filed: Aug. 9, 1976

[51] Int. Cl.$^2$ .................. F16N 11/04; B60B 27/00
[52] U.S. Cl. ................... 184/1 D; 184/45 R
[58] Field of Search ........... 184/1 D, 45 R, 45 A, 184/105 R; 308/93; 301/108 A, 108 TW

[56] References Cited

U.S. PATENT DOCUMENTS

| | | | |
|---|---|---|---|
| 2,514,799 | 7/1950 | Rubertino et al. | 184/105 B X |
| 2,952,238 | 9/1960 | Barber | 184/1 D X |
| 3,077,948 | 2/1963 | Law | 184/45 R |
| 3,498,413 | 3/1970 | Krieger | 184/45 R |
| 3,785,706 | 1/1974 | Vangalis | 184/45 R X |
| 3,955,852 | 5/1976 | De Puydt et al. | 184/45 R X |

*Primary Examiner*—David H. Brown
*Attorney, Agent, or Firm*—Fishburn, Gold & Litman

[57] ABSTRACT

An automatic lubricator for wheel bearings and closure cap for wheel hubs comprises a hollow body having an open end connected with the hub, a piston sealingly and slidably mounted in the body, and a spring member urging the piston toward the bearing and constantly applying a positive pressure on the lubricant packing the hub. A lubrication fitting for filling the lubricator is attached to the body adjacent to the open end thereof, and an overflow aperture is disposed through a side wall of the body at a point adjacent to the piston for relieving excess lubricant pressure. A heat responsive member located in the body is operative to release lubricant from the hub cavity in response to an abnormally high lubricant temperature.

10 Claims, 5 Drawing Figures

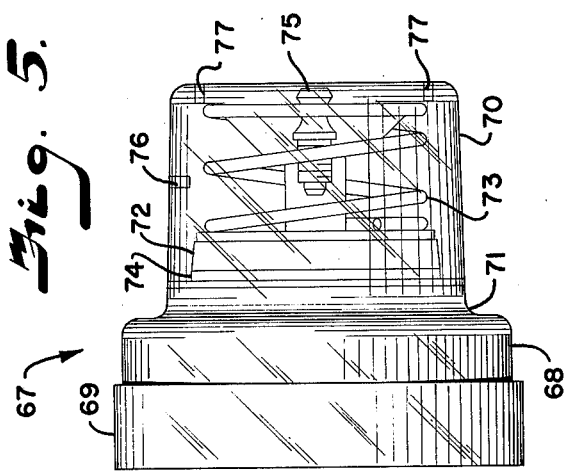
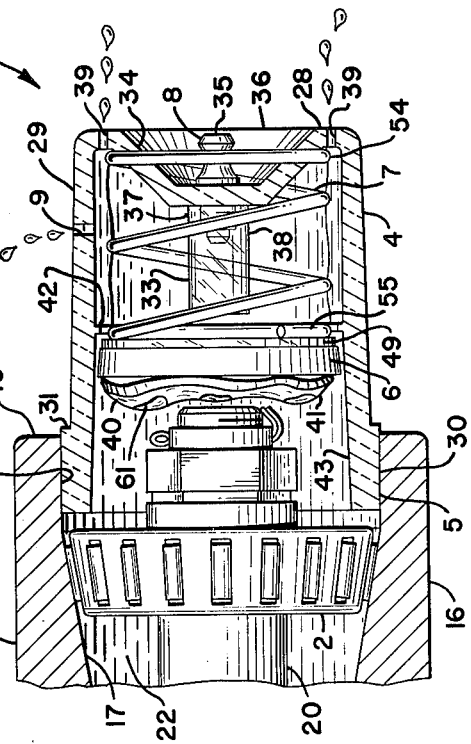
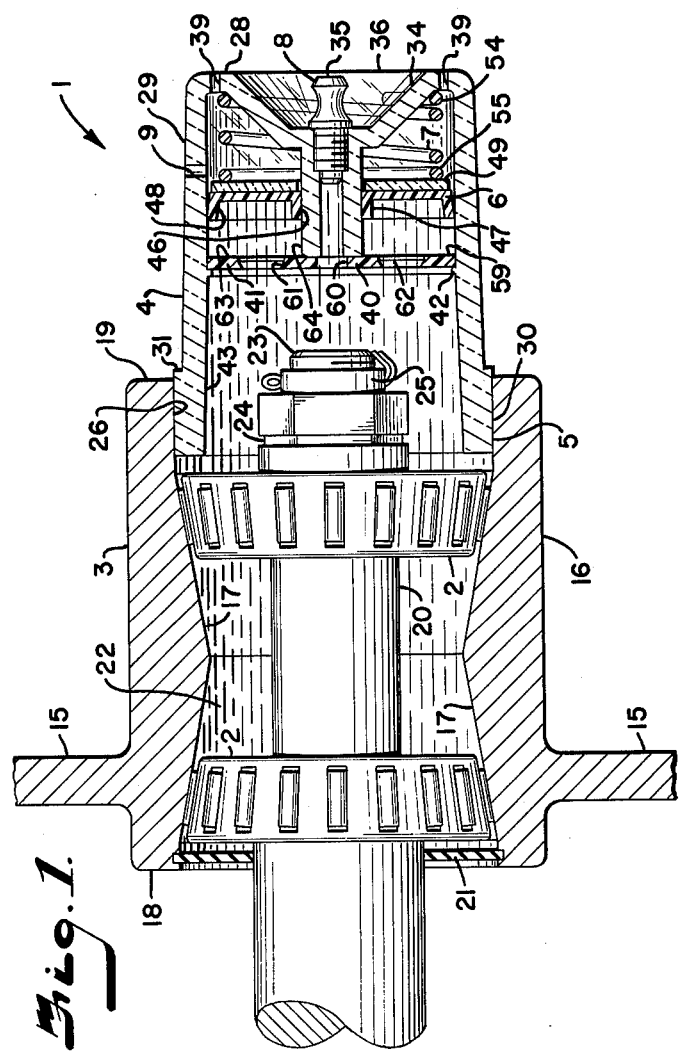
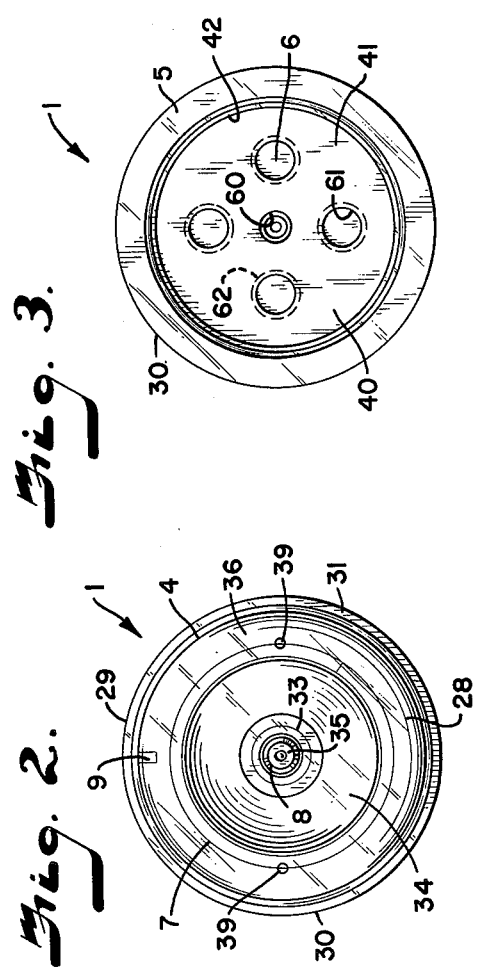

AUTOMATIC WHEEL BEARING LUBRICATOR

This invention relates to wheel bearing lubricators, and in particular to automatic lubricators for wheel hubs that are subjected to periodic emersion in water.

The principal objects of the present invention are: to provide an automatic lubricator for wheel bearings which applies a positive pressure on the lubricant in the hub thereby preventing water, sand, or other contaminants from entering the bearing housing; to provide such a lubricator which includes a spring loaded piston for constantly applying pressure on the lubricant over a substantial period of time; to provide such a lubricator having an overflow aperture disposed through the body thereof adjacent to the piston, to relieve excess lubricant pressure; to provide such a lubricator having a heat responsive mechanism for warning the user that the wheel bearing temperature is abnormally high; to provide such a lubricator having a closed end with a recessed portion, wherein a lubricant fitting is attached for improved durability; to provide such a lubricator wherein the body is constructed of a transparent material for improved wheel bearing maintenance; and to provide such a lubricator which is economical to manufacture, efficient in use, capable of a long operating life and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

FIG. 1 is a cross-sectional view of an automatic wheel bearing lubricator embodying the present invention, shown attached to a wheel hub.

FIG. 2 is an end elevational view of the wheel bearing lubricator of FIG. 1.

FIG. 3 is an end elevational view of the lubricator of FIG. 1 taken from the open end thereof.

FIG. 4 is a cross-sectional view of the lubricator of FIG. 1 shown in an extended condition for warning the user of an abnormally high wheel bearing temperature.

FIG. 5 is a side elevational view of another embodiment of the present invention adapted for engaging larger wheel hubs.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an automatic lubricator for wheel bearings 2 and closure cap for a wheel hub 3. The lubricator 1 comprises a hollow body 4 having an open end 5 thereof connected with the hub, a piston 6 sealingly and slidably mounted within the body 4, and a spring member 7 urging the piston toward the bearings 2 and constantly applying a slight positive pressure on the lubricant which is packing the hub. A lubrication fitting 8 for filling the automatic lubricator 1 is attached to the body 4 and communicates with the wheel hub 3, and an overflow aperture 9 is disposed through a side wall of the body at a point adjacent to the piston 6 for relieving excess lubricant pressure.

The wheel hub 3 is a generally cylindrical structure having radially extending structural ribs 15 attached thereto for connection with the wheel, and in this example includes a housing 16 having a pair of beveled bearing surfaces 17. The housing includes an inner end 18 and an outer end 19 and encloses a shaft or journal 20 having a pair of tapered roller bearings 2 mounted thereon in a spaced-apart, opposed and parallel manner. The inner end 18 of the hub is provided with a seal member 21 which prevents the flow of lubricant from the hub cavity 22. The outermost end 23 of the shaft 20 is threaded and has connection with a retainer 24 and safety lock mechanism 25. The outer end 19 of the housing 16 is slightly tapered and includes a smooth interior surface 26 for sealingly engaging a portion of the lubricator 1.

The lubricator 1 has a generally tubular shape, which preferably is substantially cylindrical and includes a closed end 28 and integrally attached side wall 29. An exterior surface 30 of the side walls 29 adjacent to the open end 5 is smooth, tapered, slightly larger in diameter than that of the interior surface 26, and engages the same with a slight interference fit. In the illustrated structure, the exterior surface 30 is formed on a collar portion 31 and is slightly tapered to facilitate engagement with the hub, and the body is constructed of a transparent, and rigid material such as polycarbonate. The closed end 28 includes a tubular member 33 attached thereto and communicating with the wheel hub cavity 22, and in this example has a central, recessed portion 34 wherein the outer surfaces of the lubricant fitting and closed end 35 and 36 respectively, are substantially coplanar to prevent damage to the fitting 8. The tubular member 33 has a first end 37 thereof threadingly engaging the fitting 8, and a smooth cylindrical outer surface 38 which is sealingly engaged by the piston 6. The overflow aperture 9 is disposed through the side wall 29 between the piston 6 and the closed end 28 and relieves excess lubricant pressure, and a pair of vent apertures 39 are disposed through the closed end 28 to facilitate piston movement. A heat responsive member 40 is located in the body 4, and is operative to release lubricant from the hub cavity 22 in response to an abnormally high lubricant temperature. A disc 41 engages the body 4 by means such as an inwardly projecting retainer rib, shoulder, or lip portion 42, and holds the piston 6 and spring member 7 in a pretensioned condition. The interior surface 43 of the body is enlarged at a medial portion thereof, between the lip portion 42 and the open end 5, the interrupt the seal between the same and the piston 6 when the latter is moved forwardly in response to an abnormally high lubricant temperature. In this example, the interior surface 43 is slightly conical and tapers outwardly from the lip 42 to the open end 5. When the temperature of the lubricator reaches a predetermined level, the disc 41 and lip 42 disengage, thereby allowing the spring member 7 to push the piston 6 forwardly into a non sealing relationship with the interior surface 43 of the medial portion of the body. In the illustrated structure of FIG. 4, the disc 41 is shown having a distorted shape for disengaging the lip 42. However, it is to be understood that the present device also contemplates the use of heat sensitive material for the lip 42 which would upon attaining a predetermined temperature distort and disengage disc 41.

The piston 6 is a circularly shaped structure having a central aperture 46 therethrough for sliding connection with the tubular member 33, and concentric lip portions 47 and 48 facing the open end 5 and having sealing engagement with the outer surface 38 and interior surface 43 respectively. The piston is preferably constructed of a soft, flexible material such as polyvinylchloride to improve seal integrity. Further, in the illustrated structure, a rigid backing disc 49 having a central aperture therethrough for sliding connection with the tubular member 33, is positioned between the spring member 7 and the back of the piston 6 to assure even, resilient pressure and smooth piston translation on the tubular member.

In the illustrated structure, the spring member 7 comprises a helical coil spring having one end 54 thereof engaging the closed end 28 of the body, and the other end 55 thereof engaging the backing disc 49. As the spring is subjected to periodic immersion in water, it is preferably constructed of a non-corrosive metal such as stainless steel or the like.

The circular retainer or disc 41 includes an outer peripheral portion 59 which engages the rim portion or lip 42 of the body and retains the piston and the spring member in a compressed or prestressed condition. The disc 41 includes a central aperture 60 communicating with the tubular member 33 through which incoming lubricant is injected into the cavity 22, and at least one radial aperture 61 for transmitting lubricant pressure from the hub cavity to the piston 6. In the illustrated structure, the disc 41 includes four regularly spaced circular holes having counterbore portions 62 facing the closed end 28 of the body, and the outwardly surface 63 of the disc is positioned adjacent to the second end 64 of the tubular member 33. To facilitate operation as a warning device, the disc is constructed of a material whose shape will distort upon reaching a predetermined temperature. Synthetic resin materials have been found to have such characteristics and, the use of styrene which will distort at approximately 180° F, and A.B.S. which distorts at around 200° F, are particularly useful in lubricators for boat trailer hubs which normally operate at a temperature between 100° - 150° F. It is to be understood that the particular synthetic material used may be varied for the specific hub application, ambient conditions, and the safety margin desired by the user.

Another embodiment of the present invention is generally designated by the reference numeral 67 and includes an enlarged open end 68 and collar portion 69 for engaging wheel hubs having a larger diameter. The closed end portion 70 of the lubricator is substantially identical with the previously described embodiment and has integral connection with the enlarged open end 68 along a rounded juncture 71. Lubricator 67 further comprises piston 72, spring member 73, disc 74, lubrication fitting 75, overflow aperture 76 and vent apertures 77.

In use, the lubricator 1 is attached to a wheel hub 3 in a conventional fashion with a slight interference fit. A source of pressurized lubricant, generally grease or a heavy grade oil is attached to the fitting 8 and transmits the same through tubular member 33 into the housing cavity 22. To assure that the cavity is completely full of grease, the user continues to inject lubricant into the lubricator until the pressure thereof overcomes the force of the spring member 7 and moves the piston 6 rearwardly. If the user continues injection, until the outer piston lip 48 passes the overflow aperture 9, excess grease will be expelled through the over-flow passageway until such time as the spring force is greater than the force exerted on the piston by the lubricant pressure. The piston will then move forwardly, past the aperture 9 stopping the overflow with the piston sealed against the interior surface 43 of the body. The spring loaded piston will provide a slight positive pressure on the lubricant during use to prevent the introduction of foreign matter into the bearings. Because the body portion 4 of the lubricator is constructed of a clear material, it is readily apparent when additional lubricant must be added. As a detection or warning device, if the bearings overheat due to a deteriorated condition, lack of sufficient lubricant or the like, the disc 41 will distort or wrinkle and disengage from the lip portion 42 of the body (FIG. 4). The force of the compressed spring member 7 will cause the unrestrained piston 6 to move forwardly toward the shaft end 23, and thereby position the same in a non-sealing condition within the interior surface 42 of the medial body portion. The heated lubricant will then flow past the piston 6 and through the overflow and vent apertures 9 and 39 respectively, the discharge providing a signal for the user that the wheel bearings are operating at an abnormally high temperature and that maintenance or replacement will be necessary to prevent seizure. Even though the hub cavity 22 is completely full of lubricant, the piston's seal is broken by the distorting disc 41, and lubricant leaks slowly past the piston, thereby creating a void to allow piston translation and accelerated discharge.

It is to be understood that while I have illustrated and described certain forms of my invention, it is not to be limited to the specific forms or arrangement of parts herein described and shown.

I claim:

1. A wheel bearing lubricator comprising:
   a. a hollow body having side walls, a central aperture, a first end, a medial portion, and a second end; said first end being adapted for sealing engagement with a wheel hub; said second end having a substantially cylindrically shaped interior surface, and said medial portion having an relatively enlarged interior surface;
   b. a piston slidably mounted within said second end; said piston having a marginal edge thereof normally sealingly engaging the interior surface of said second end; said piston being slidably mounted in said body for translation into said medial portion wherein the marginal edge of said piston assumes a non-sealing position with respect to the interior surface of said medial portion;
   c. a relief opening positioned through said body and disposed rearwardly of said piston and in spaced relation thereto;
   d. resilient means urging said piston toward said medial portion; and
   e. means normally limiting piston travel to translation within the second end of said body; said limiting means being heat responsive whereby upon attaining a predetermined temperature, said limiting means releases said piston, and said resilient means urges said piston into the medial portion of said body and into said non-sealing position therewith thereby allowing lubricant to flow from said medial portion and through said relief opening, and escape from the lubricator as a warning signal.

2. A wheel bearing lubricator as set forth in claim 1 wherein said limiting means comprises:
   a. a retainer connected with said second end and projecting inwardly from the interior surface thereof;
   b. a disc having a circular shape and a peripheral portion; said disc being positioned between said retainer and said piston; the peripheral portion of said disc abuttingly engaging said retainer whereby the travel of said piston is limited to a normally forwardmost position wherein said resilient means is tensioned and urges said piston toward said medial portion; and
   c. said disc being constructed of a heat responsive material whereby upon attaining a predetermined temperature, the shape of said disc distorts and the peripheral portion thereof disengages said retainer.

3. A wheel bearing lubricator as set forth in claim 1 wherein said limiting means comprises:
   a. a retainer connected with and projecting inwardly of the interior surface of said second end; said retainer having a cross sectional, protruding shape;
   b. a disc having a circular shape and a peripheral portion; said disc being positioned between said retainer and said piston; the peripheral portion of said disc abuttingly engaging said retainer whereby the travel of said piston is limited to a normally forwardmost position wherein said resilient means is tensioned and urges said piston toward said medial portion; and
   c. said retainer being constructed of a heat responsive material whereby upon attaining a predetermined temperature, the shape of said retainer distorts and disengages the peripheral portion of said retainer.

4. Wheel bearing lubricator as set forth in claim 1 including:
   an overflow aperture disposed through the side walls of said body at a point thereon disposed adjacent to said piston whereby the pressure of lubricant in said hub moves said piston away from said first end to a position wherein said hub and said overflow aperture are communicating to prevent excess grease pressure.

5. A wheel bearing lubricator comprising:
   a. a hollow cap having upstanding side walls, a central aperture, an open end, a medial portion, and a closed end; said open end being adapted for sealing engagement with a wheel hub; said closed end and said medial portion each having an interior surface with a substantially cylindrical shape and a diameter; the diameter of said medial portion being larger than the diameter of said closed end, and forming a stepped shoulder between said medial portion and said closed end;
   b. a tubular member having connection with a central portion of said closed end and extending therefrom between and concentrically with said side walls;
   c. a lubrication fitting connected with said closed end and communicating with said tubular member;
   d. a piston slidably and sealingly mounted on said tubular member and having a marginal edge thereof normally sealingly engaging the interior surface of the closed end; said piston being slidably mounted on said tubular member for translation into said medial portion wherein the marginal edge of said piston assumes a non-sealing position with respect to the interior surface of said medial portion;
   e. a spring member positioned between said piston and said closed end, and urging said piston toward said medial portion;
   f. a vent aperture disposed through said cap at a point adjacent to said closed end; and
   g. means normally limiting piston travel to translation within the closed end of said body; said limiting means being heat responsive whereby upon attaining a predetermined temperature, said limiting means releases said piston, and said resilient means urges said piston past said stepped shoulder into the medial portion of said body and into said non-sealing position thereby allowing lubricant to flow from said medial portion through said vent aperture, and escape from the lubricator as a warning signal.

6. A wheel bearing lubricator as set forth in claim 5 wherein said limiting means comprises:
   a. a lip connected with, projecting inwardly from, and extending circularly around the interior surface of said side walls in said closed end at a point disposed adjacent to said medial portion;
   b. a disc having a circular shape and a peripheral portion; said disc being positioned between said lip and said piston; the peripheral portion of said disc abuttingly engaging said lip whereby the travel of said piston is limited to a normally forwardmost position wherein said resilient means is compressed and urges said piston toward said medial portion; said disc having first and second apertures therethrough; said first aperture being disposed through a central portion of said disc and communicating with said tubular member, and said second aperture being disposed between the central and peripheral portions of said disc for communicating hub lubricant pressure to said piston; and
   c. said disc being constructed of a heat responsive material whereby upon attaining a predetermined temperature, the shape of said disc distorts and the peripheral portion thereof disengages said lip.

7. A wheel bearing lubricator as set forth in claim 6 including:
   a. an overflow aperture disposed through said side walls at a point thereon disposed adjacent to said closed end whereby the pressure of lubricant in said hub moves said piston away from said open end to a position wherein said central aperture and said overflow aperture are communicating to prevent excess grease pressure.

8. A wheel bearing lubricator as set forth in claim 7 including:
   a. a backing disc having a central aperture therethrough, and being slidably connected with said tubular member and positioned between said piston and said spring member.

9. A wheel bearing lubricator as set forth in claim 7 wherein:
   a. said closed end includes a central, recessed portion, and said lubrication fitting is disposed therein, whereby a top surface of said fitting and said closed end are respectively substantially coplanar.

10. A wheel bearing lubricator as set forth in claim 7 wherein:
   a. said spring member comprises a helically coiled wire spring; and
   b. said cap member is constructed of a transparent synthetic resin material.

* * * * *